United States Patent [19]
Smith

[11] Patent Number: 5,258,944
[45] Date of Patent: Nov. 2, 1993

[54] HIGH PERFORMANCE MANTISSA DIVIDER

[75] Inventor: James E. Smith, Colfax, Wis.

[73] Assignee: Cray Research, Inc., Eagan, Minn.

[21] Appl. No.: 938,715

[22] Filed: Sep. 1, 1992

[51] Int. Cl.$^5$ ............................ G06F 7/38; G06F 7/52
[52] U.S. Cl. ..................................... 364/748; 364/767
[58] Field of Search ............... 364/748, 767, 766, 764, 364/761

[56] References Cited

U.S. PATENT DOCUMENTS

| | | | |
|---|---|---|---|
| 3,733,477 | 5/1973 | Tate et al. | 364/767 |
| 4,546,447 | 10/1985 | Sawada | 364/767 |
| 4,939,686 | 7/1990 | Fandrianto | 364/752 |
| 4,979,142 | 12/1990 | Allen et al. | 364/767 |
| 5,128,891 | 7/1992 | Lynch et al. | 364/767 |
| 5,132,925 | 7/1992 | Kehl et al. | 364/764 |

OTHER PUBLICATIONS

"Algorithm for High Speed Shared Radix 8 Division and Radix 8 Square Root," by Jan Fandrianto, *9th Symposium on Computer Arithmetic*, IEEE Computer Society Press, pp. 68–75, no publication date.
"Radix-16 Signed-Digit Division," by Tony M. Carter and James E. Robertson, *IEEE Transactions on Computers*, vol. 39, No. 12, Dec., 1990, pp. 1424–1433.
"Radix-4 Square Root Without Initial PLA," by Milos D. Ercegovac and Tomas Lang, Computer Science Department, School of Engineering and Applied Science, University of Califonria, Los Angles, source unknown, *IEEE*, 1985, pp. 162–168.
"Practical Cellular Dividers," by Franco P. Preparata, and Jean E. Vuillemin, *IEEE Transactions on Computers*, vol. 39, No. 5, May 1990, pp. 605–614.
"Algorithm for High Speed Shared Radix 4 Division and Radix 4 Square-Root," by Jan Fandrianto, source unknown, *IEEE*, 1987, pp. 73–79.
"Higher-Radix Division Using Estimates of the Divisor and Partial Remainders," by Daniel E. Atkins, *IEEE Transactions on Computers*, vol. C-17, No. 10, Oct., 1968, pp. 925–934.
"A Division Algorithm with Prediction of Quotient Digits," by M. D. Ercegovac and T. Lang, Computer Science Department, University of California, Los Angeles, *IEEE*, 1985, pp. 51–56.
"Radix 16 SRT Dividers with Overlapped Quotient Selection Stages—A 225 Nanosecond Double Precision Divider for the S-1 Mark IIB," by George S. Taylor, Computer Science Division, EECS, University of California, Berkeley, *IEEE* 1985, pp. 64–71.
"A Radix-4 On-Line Division Algorithm," by Paul K.-G. Tu and Milos D. Ercegovac, Computer Science Dept., University of California, L.A., *IEEE* 1987, pp. 181–187.
"Simple Radix-4 Division with Operands Scaling," by

(List continued on next page.)

Primary Examiner—Tan V. Mai
Attorney, Agent, or Firm—Merchant, Gould, Smith, Edell, Welter & Schmidt

[57] ABSTRACT

A high performance floating point mantissa divider employs SRT division, a Radix-4 redundant digit set and the principles of carry-save addition. At each step in the division, the upper few most significant bits of the partial remainder and the divisor are inspected via a look-up table to select the appropriate quotient digits. The quotient digits are represented in a Radix-4 redundant digit set, and the look-up table is generated using SRT division principles. The selected quotient digit is used to control a multiplexor which selects the selected multiple of the divisor. This value is subtracted from the partial remainder via a carry-save adder to form the new partial remainder. As the quotient digits are generated, they are placed in two shift registers, one for the sum digits and one for carry digits. When the division is complete, the shift registers are added to give the final quotient mantissa. A combination of a carry save adder and carry look ahead adder reduce the practical implementation to only 8 logic levels.

11 Claims, 3 Drawing Sheets

OTHER PUBLICATIONS

Milos D. Ercegovac and Tomas Lang, *IEEE Transactions on Computers*, vol. 39, No. 9, Sep., 1990, pp. 1204–1208.

"Implementation of Fast Radix-4 Division with Operands Scaling," by Milos D. Ercegovac, Tomas Lang, and Ramin Modiri, Computer Science Dept., School of Engineering and Applied Science, University of California, L.A., *IEEE* 1988, pp. 486–489./

"Design of a High-Speed Square Root Multiply and Divide Unit," by J. H. P. Zurawski and J. B. Gosling, *IEEE Transactions on Computers*, vol. C-36, No. 1, Jan., 1987, pp. 13–23.

"An American National Standard," IEEE Standard for Binary Floating Point Arithmetic, IEEE 1985, pp. 7–17.

"Faster Ways to Fast Math," by Tom Brighlman, Cyrix Corporation, Richardson, Tex., no publication date.

"Math Chip, Compatible with 80387, Churns Out Numbers Up to Ten Times Faster," by Dave Bursky, Electronic Design, Oct. 12, 1989.

"High Speed Division Using Minimum Redundant P-ary Representation," by Takeomi Tamesada, source unknown, vol. J71-D, pp. 957–965, 1988.

HIGH PERFORMANCE MANTISSA DIVIDER

FIELD OF THE INVENTION

The invention relates generally to the field of computational units for high speed computing systems, and more specifically to a high performance floating point mantissa divider implemented using radix four SRT division.

BACKGROUND OF THE INVENTION

Digital computers are designed to perform a variety of arithmetic instructions on binary numerical data. Within the central processing unit (CPU) of these digital computers resides a major subdivision called the arithmetic logic unit (ALU). The ALU is used to perform a variety of data processing and arithmetic operations under the control of the CPU. Of particular significance to the present invention is the architecture, design, and method used for performing floating point division.

As is well known in the field, floating point division is performed by separating the sign, exponent, and mantissa bits of the dividend and divisor, and performing the necessary operations on each corresponding set of bits. The sign bit operation entails taking the exclusive-OR of the dividend sign bit and the divisor sign bit to obtain the quotient sign bit. The exponent operation involves the subtraction of the divisor exponent from the dividend exponent to obtain the quotient exponent. Obtaining the quotient mantissa requires a more complex algorithm and architecture, and is the factor which greatly limits the speed in which a divide can be performed. The divisor mantissa must be repeatedly subtracted from the dividend or partial remainder until the desired precision is reached, which then terminates the operation. Depending on the precision desired and the algorithm used, the mantissa division operation can take up a significant amount of processing time.

Divide operations are slow because division typically involves the trial and error determination of quotient digits. The simplest binary implementation, restoring division, must methodically determine quotient values, one bit at a time. This is done by first positioning the divisor with respect to the dividend and performing a subtraction to calculate a partial remainder. If the partial remainder is zero or positive, a quotient digit of 1 is determined, the next of the divisor is appended onto the partial remainder as the least significant bit, the divisor is shifted and another subtraction is performed. However if the partial remainder is negative, a quotient bit of 0 is determined, and the dividend must be "restored" by adding back the divisor to the partial remainder. This "restoring" results in a significant reduction in performance.

Another drawback to the restoring division method is that a full subtraction must be performed at each step. In high performance 64-bit machines, such as those made by Cray Research, Inc., the assignee of the present invention, performing a full subtraction and a possible correcting addition at each step is far too time consuming in terms of processing speed to be effective.

Nonrestoring division improves on this algorithm by eliminating the need to restore the partial remainder after an unsuccessful subtraction (i.e., a negative partial remainder). However, most nonrestoring division techniques still require performing either a full subtraction or a full addition at each step, thus limiting their desirability as an effective division tool.

SRT Division. The well-known SRT division algorithm is presently a widely accepted algorithm known to reduce mantissa division time.

The SRT divide algorithm is as follows:

Let: $p_0$ = dividend
$p_i$ = partial remainder after ith iteration
$d$ = divisor
$q_i$ = ith digit (2 bits in the present invention) of quotient The basic iteration is the following:

$$p_{i+b} = 4(p_i - q_{i+1}d)$$

That is, the i+1st quotient digit times the divisor is subtracted from the ith partial remainder. Then the partial remainder is shifted by 2 bits (e.g., multiplied by 4 to form $p_{i+1}$.

Initially, $1 \leq p_0 < 2$ and $1 \leq d < 2$. Then, at each step, $p_{i+1}$ is maintained in the following range:

$$-2d/3 \leq p_{i+1}/4 \leq 2d/3$$

That is, before shifting, the partial remainder is between plus and minus 2d/3 range. After shifting, $$-3d/3 \leq p_{i+1} \leq 8d/3.$$

The next quotient must then be chosen to force the partial remainder back into the plus or minus 2d/3 range.

SRT division is often used with a higher radix redundant digit set, such that only a few of the highest order bits of the divisor and the partial remainder need be examined to select a proper quotient digit.

Radix Four Digit Set. One such set is the radix four redundant digit set. This set:

$$\{-3, -1, 0, 1, 2\}$$

This is a redundant digit set, which means there is more than one representation for any given number (except 0). For example, any number can be represented by a binary equivalent using 1's and 0's. The binary representation may be expanded by using 1, 0, and −1. (−1 will be represented herein using an underline e.g. 1). Now, any number, except 0, can be represented by a plurality of binary equivalents. The number seven (7) for example, can be represented by 0111 or 1001, or the number two (2) can be represented by 0010, 0110, or 1110, as follows:

```
0111 => (0 × 8) + (1 × 4) + (1 × 2) + (1 × 1) = 7;
1001 => (1 × 8) + (0 × 4) + (0 × 2) + (−1 × 1) = 7;
0010 => (0 × 8) + (0 × 4) + (1 × 2) + (0 × 1) = 2;
0110 => (0 × 8) + (1 × 4) + (−1 × 2) + (0 × 1) = 2;
1110 => (1 × 8) + (−1 × 4) + (−1 × 2) + (0 × 1) = 2.
```

Further radix four examples include:

```
002 => (0 × 16) + (0 × 4) + (2 × 1) = 2
012 => (0 × 16) + (1 × 4) + (−2 × 1) = 2
021 => (0 × 16) + (2 × 4) + (−1 × 1) = 7
121 => (1 × 16) + (−2 × 4) + (−1 × 1) = 7
```

A well-known means of implementing the SRT divide algorithm is to combine it with the Radix-4 redundant digit set. In this implementation, the following inequalities have been determined to keep the partial remainders in the proper range:

---
If $4d/3 \leq p_i \leq 8d/3$, then select $q_{i+1} = 2$ to force the condition $-2d/3 \leq p_{i+1} \leq 2d/3$;
If $1d/3 \leq p_i \leq 5d/3$, then select $q_{i+1} = 1$;
If $-2d/3 \leq p_i \leq 2d/3$, then select $q_{i+1} = 0$;
If $-5d/3 \leq p_i \leq -1d/3$, then select $q_{i+1} = -1$;
If $-8d/3 \leq p_i \leq -4d/3$, then select $q_{i+1} = -2$.
---

For example, one radix four SRT divider has been described in J. Fandrianto, "Algorithm for High Speed Shared Radix Four Division and Radix Four Square Root", Proceedings of the 8th Symposium on Computer Arithmetic, May 1987, pp. 73-79, which is incorporated herein by reference. However, this and other SRT dividers proposed to date still require a large logic delay path which limits the speed in which a division is accomplished.

One way to measure computation unit performance is by the number of gate delays which can be suffered per clock period. The number of gate delays through the unit per iteration in a given system limits the speed in which the final result can be obtained. A large number of gate delays also limits the clock speed at which a synchronous unit can operate, because intermediate results cannot be latched until the appropriate signal has propagated through all present gate delays without risking the latching of invalid data.

For example, the SRT divider discussed in the Fandrianto reference contains a total of 12 gate delays per iteration in the critical path. This divider is shown in block diagram form in FIG. 1. In operation, CSA 16 forms and latches the sum/carry representation of the partial remainder, CLA 22 adds the upper bits of the sum/carry portion of the partial remainder to arrive at an approximation of the partial remainder. Complementer 26 forms the absolute value of the approximated partial remainder, which is then fed into quotient select logic 30 along with the four upper most bits of the divisor. Quotient select logic 30 contains a look-up table which gives the absolute value of the quotient digit, whose sign is the same as the sign of the partial remainder. Finally, the quotient value is fed into multiplexor logic 12 which selects the correct multiple of the divisor to be subtracted from the partial remainder.

Figure 1:
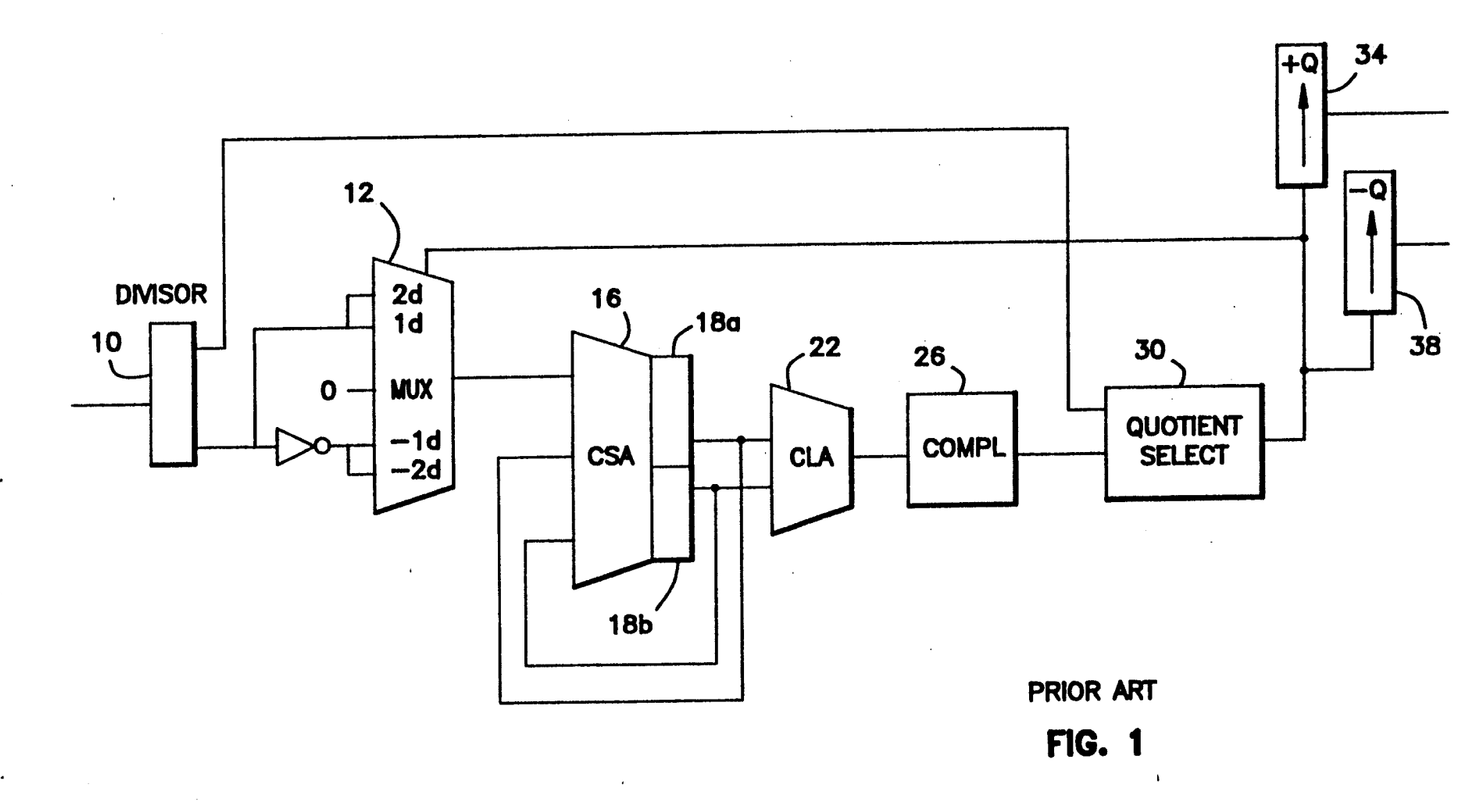
FIG. 1 shows a block diagram of the prior art divider discussed in the Fandrianto reference discussed above.

Upon quotient digit selection, the partial quotient digits are placed in one of two shift registers, depending on their sign. Each register receives a value for each iteration. If the quotient digit selected is positive, the plus quotient register ($+Q34$) receives the appropriate pair of bits and the minus quotient register ($-Q38$) receives a pair of '0' bits. If the quotient selected is negative, $-Q$ register 38 receives the appropriate pair of bits and $+Q$ register 34 receives a pair of '0' bits. If the quotient selected is '0', then both registers receive a pair of '0' bits. Each iteration the appropriate digits are loaded into the least significant bit position, then shifted up two bits in preparation to receive the next quotient digits. When the division is completed, the $-Q$ register 38 is subtracted from $+Q$ to give the final quotient. For example:

---
quotient digits selected = 0 +1 -2 +1 -1 0 +2;

then,
+Q register = 00 01 00 01 00 00 10
-Q register = 00 00 10 00 01 00 00
Q+ - Q- = 00 00 10 00 11 00 10 (final quotient).
---

The critical loop for timing purposes in the divider of FIG. 1 is the one from Carry Save Adder (CSA) 16, through the CSA sum 18$a$ and carry 18$b$ latches Carry Lookahead Adder (CLA) 22, complementer 26, quotient select logic 30 and back to multiplexor logic 12. In the critical loop of the divider shown in FIG. 1 there are two gate delays for CSA 16, two for complementer 26, four (at least) for CLA 22, two (at least) for quotient select logic 30 and two gate delays for multiplexor logic 12, for a total of at least 12 gate delays per iteration. For certain high performance computing machines such as those manufactured by Cray Research, Inc., the assignee of the present invention, 12 gate delays does not meet the performance requirements of the machine. There is therefore a need in the art for a very high speed divider which can be used in high performance applications which can arrive at a quotient in the least number of gate delays.

SUMMARY OF THE INVENTION

To overcome the deficiencies in the art described above, the present invention provides a high performance floating point divider employing SRT division and a radix four redundant digit set which can accomplish a divide in a very small number of logic levels. In operation, the input operands (dividend and divisor) are received, and the mantissas are separated from the exponents and signs. The mantissas are latched and held inside a mantissa divider. At each step the partial remainder and divisor are inspected to select a quotient digit, which is represented in a radix four redundant digit set form. The quotient digit is used to control a multiplexor which selects and latches the selected divisor multiple (quotient times divisor). This value is then subtracted from the partial remainder ($p_i$) via a carry save adder (CSA) to form the new partial remainder ($p_{i+1}$). The partial remainder is stored in three registers, some bits are stored in carry-save form, with sums in a first register and carries in a second register. The uppermost significant bits are stored in a third register in assimilated (e.g. sums and carries added together) form. These bits, and the uppermost significant bits of the divisor, are used to determine the appropriate quotient digit via a look-up table generated using the well-known SRT division algorithm. As the quotient digits are generated they are placed in two shift registers, one for the sum quotient digits and one for the carry quotient digits. When the division is complete, the shift registers are added to give the final quotient mantissa. The implementation significantly improves on performance of existing dividers and is able to complete a mantissa divide in eight logic levels per clock period.

BRIEF DESCRIPTION OF THE DRAWINGS

In the drawings, where like numerals refer to like elements throughout the several views.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. It is to be understood that other embodiments may be utilized and structural changes made without departing from the scope of the present invention.

The present invention provides a floating point mantissa divider implemented using SRT division and a radix four redundant digit set, which accomplishes a divide in 8 logic levels per clock period. The invention greatly improves upon the performance of existing dividers, and is appropriate for use with very high speed computing machines such as those manufactured by Cray Research, Inc., the assignee of the present invention.

Those skilled in the art will readily recognize that the number of gate delays given are, in a sense, approximate. This is because in theory, any combinational function can be done in only two gate delays. However, practical considerations such as gate fan-in, fan-out, and the number of gates tend to increase the number of levels. Hence, the number of gate levels is based on typical practical limitations and considerations.

Figure 2:
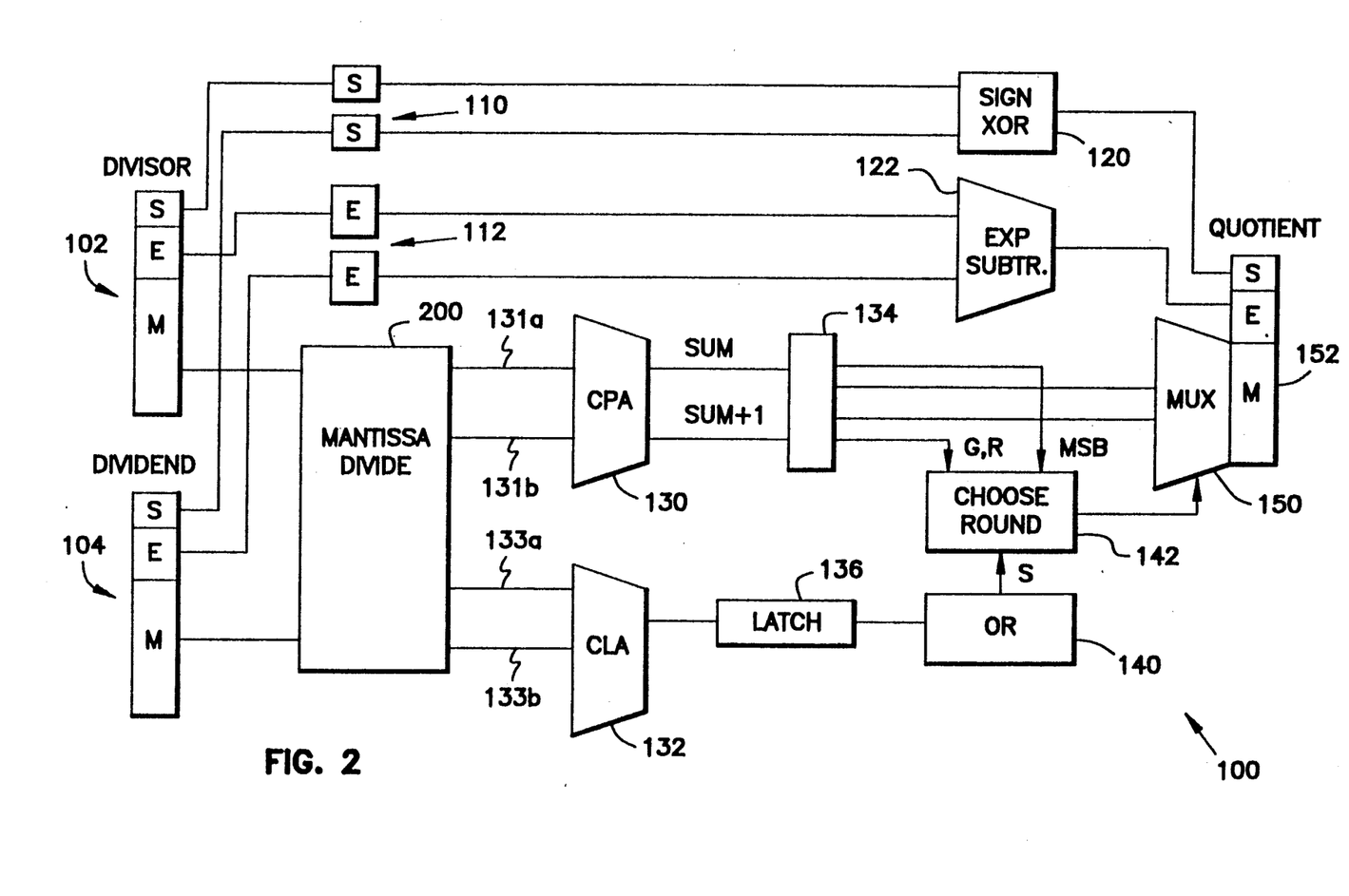
FIG. 2 is a block diagram of the floating point divider of the present invention.

FIG. 2 shows a block diagram of a floating point divider 100. Divider 100 consists of a set of latches 102 and 104 to receive the divisor and dividend operands, respectively, mantissa divider 200, which is a hardware implementation of the Radix-4 SRT mantissa divide algorithm described above, logic for calculating the exponent and sign of the quotient and logic for forming and rounding the final quotient. The dividend and divisor are in the preferred embodiment held in IEEE floating point format, a format that is well-known to those of ordinary skill in the art and which is described in detail in IEEE Standard Number 754-1985. The IEEE standard 64-bit double precision format used with the present invention consists of a 64 bit word comprising 1 sign bit S, 11 exponent bits E, and 52 mantissa bits M. Since binary normalization is used, the most significant bit of the mantissa is always equal to 1 and is not explicitly represented. The 52 bits in the mantissa field therefore represent the fractional portion of the mantissa. The 11 bit exponent field gives a range of $0 < \exp < 2047$, with 0 and 2047 representing the special values of exact 0 and infinity. The actual exponent lies in the range $-1022 \leq \exp \leq 1023$, or approximately $10^{\pm 308}$ decimal. It shall be understood, however, that the present invention could be used with any precision and any format, and is in no way limited to 64-bit IEEE format. For example 32-bit IEEE format could be used, the 64-bit Cray format, or any of a multitude of other numerical formats without departing from the scope of the present invention.

To perform a division, divider 100 separates the sign, exponent and mantissa fields and performs the necessary operations on each set of bits. The sign bits of the divisor and the dividend are exclusive OR'd (XOR) at block 120 to determine the sign of the quotient. The divisor exponent is subtracted from the dividend exponent at block 122 to determine the initial exponent of the quotient. (Normalization after the mantissa division is complete may adjust the exponent slightly.) The resultant sign and exponent bits are latched into result register 152, which after the mantissa divide operation is completed contains the final quotient.

The dividend and divisor mantissas are latched and held inside the mantissa divider 200, which will be described in more detail below. As an overview, at each step in the divide, the upper 4 bits of the partial remainder and divisor are inspected to select the appropriate quotient digit. This selected quotient digit controls a multiplexor that selects and latches the appropriate divisor multiple (the term "$q_{i+1}d$" in the above described SRT division description) to be subtracted from the partial remainder (initially the dividend is the partial remainder). The latched $q_{i+1}d$ is then subtracted from the partial remainder $p_i$ via a carry save adder to form the new partial remainder $p_{i+1}$, which is saved in carry save form (sums and carries separate). The upper 9 bits of the partial remainder, used for quotient digit selection, are not saved in carry save form but are used in their complete, carry assimilated form. After the mantissa divide is complete, carry propagate adders 130 and 132 generate the guard, round and sticky bits which are manipulated in choose round logic 142 and multiplexor 150 to perform IEEE rounding.

Figure 3:
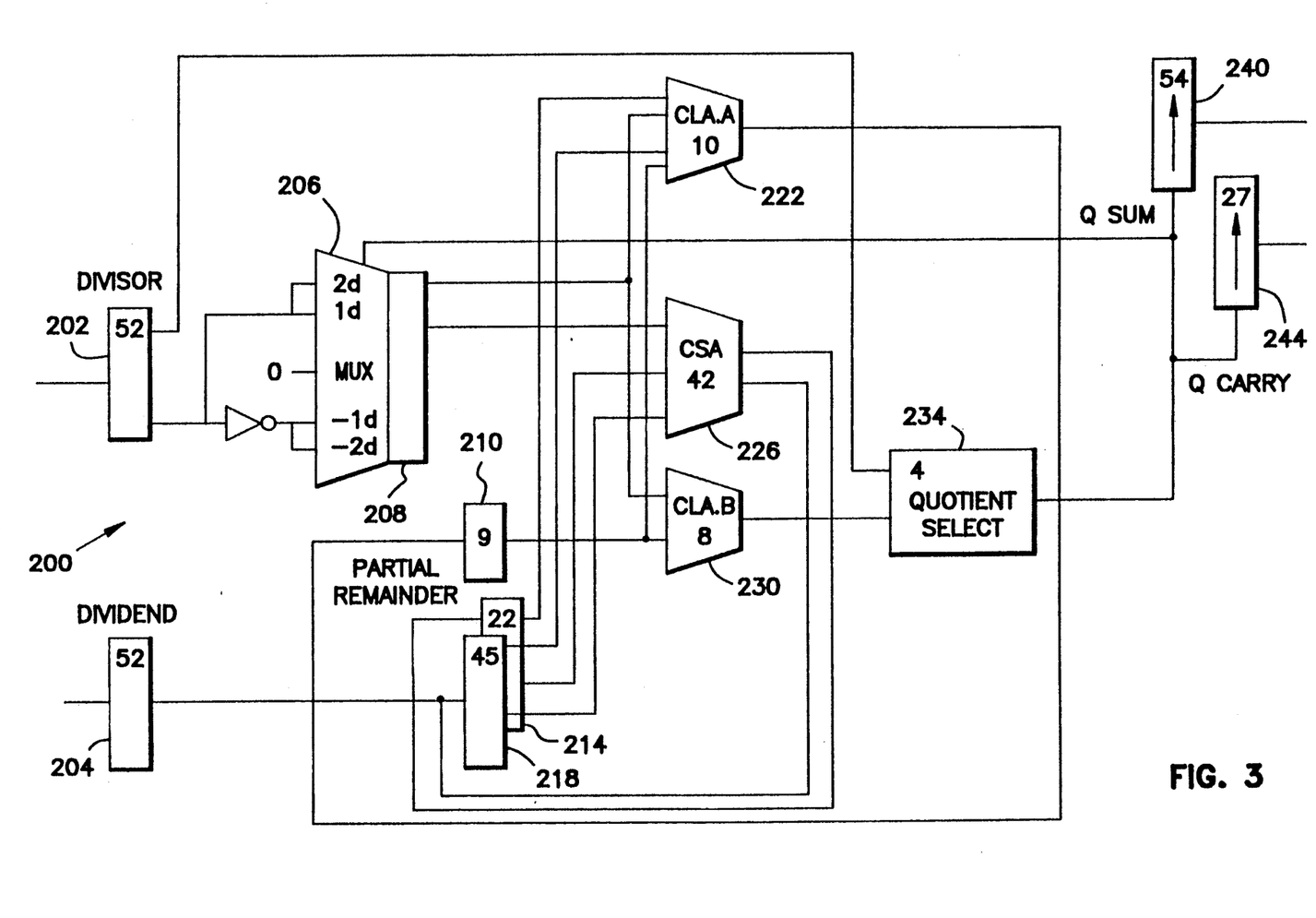
FIG. 3 is a detailed block diagram of the floating point mantissa divider of the present invention.

FIG. 3 shows the mantissa divider of the preferred embodiment of the present invention. It improves upon the performance of the divider of FIG. 1 by, among other things, eliminating four gate levels in the following ways.

First, the upper bits of the partial remainder are maintained intact (in register 210), rather than as a sum/carry pair. This requires a 10-bit carry lookahead adder (CLA.A 222) that adds the upper bits of the selected divisor multiple to the previous upper partial remainder bits, along with two bit positions of sum/carry partial remainder. This compensates for the two most significant bits of partial remainder that are shifted out during each step. CLA.A 222 can take up to six gate levels.

The upper bits of the partial remainder are also added to the divisor multiple in CLA.B 230. This adder is only eight bits wide, and finishes in four gate levels. CLA.A 222 and CLA.B 230 overlap in some of their middle bits, but they are implemented with two separate adders in the preferred embodiment because their low order bits are different and they have different widths and speed requirements. It shall be understood by those of skill in the art, however, that CLA.A and CLA.B could be merged into one adder without departing from the scope of the present invention. However, whether CLA.A and CLA.B can be merged depends on whether the specific technology, such as gate fan-in assumptions made during the design, permits such an implementation with only 4 gate levels for the bits currently produced by CLA.B and 6 levels for those produced by CLA.A The complementer 26 of FIG. 1 is eliminated. Instead, separate quotient selection logic for positive and negative partial remainders is implemented rather than sharing the same logic as is done in the divider of FIG. 1.

In addition, CSA 226 works on pairs of bits in the preferred embodiment of the present invention. CSA 226 essentially ripple-carries two adjacent bits to form two sum bits and a single carry bit. Among other things, this reduces latch cost. The quotient bits are also held in a similar manner. During each clock period the positive and negative quotient digits are added to produce a two bit sum and a single carry bit. When the division is complete, the sums (stored in Q sum) and carries (stored in Q carry) are assimilated with a CLA add to produce the final quotient.

A detailed description of the preferred embodiment of the mantissa divider 200 of the present invention will now be given, with reference to FIG. 3. A divide operation begins by latching the divisor mantissa into divisor register 202, the dividend mantissa into partial remainder registers 210 and 218, and resetting multiplexor register 208 and partial remainder carry register 214. Both divisor and dividend mantissas are 53 bits long for 64-bit double precision operation (e.g. 52 bit mantissa field +1 bit for IEEE hidden "1").

Key to achieving the high performance of the present invention is the way the partial remainder is stored and manipulated. The partial remainder is stored each iteration in registers 210, 214 and 218. All three registers together comprise the current value of the partial remainder. The partial remainder is 54 bit value with 53 bit value +1 sign bit. The partial remainder is divided among registers 210, 214 and 218 in a manner which increases performance of the divider by reducing the number of logic levels per clock period required for one iteration through the divider. Sum register 218 contains the 45 least significant bits of the partial remainder, stored in carry save form as a signed, 2's complement number. Carry register 214 contains the carry out bits from carry save adder (CSA) 226. Carry register 214 is only 22 bits wide instead of 45, the width of sum register 218, because 2 sum bits and 1 carry bit are generated per iteration in the preferred implementation. Register 210 stores the upper 9 bits of partial remainder in non-carry save or assimilated form. The carries are added in via carry look ahead adder 222 (CLA.A) and the result is stored in register 210. These 9 bits are used to determine the 4 bit output of carry look ahead adder 230 (CLA.B) and the sign bit for a total of 5 bits. These 4 bits are those used by quotient select logic 234 to determine the next quotient digit. Although only 4 bits are required for quotient digit selection, 9 bits are input to CLA.B to increase precision of the resulting 4-bit output. Splitting the partial remainder amongst three storage registers as described increases divider performance because only the upper 9 bits are carry-assimilated, as opposed to performing a full 54 bit mantissa add which would be required if the entire partial remainder was assimilated.

Register 210 is a 9-bit register and is initially loaded with the seven most significant bits of the dividend mantissa into the seven least significant bit positions (bits 0–6). Bit 7 (the eight bit value) of register 210 is loaded with a '1' corresponding to the most significant bit of the mantissa which is not explicitly represented under binary normalization. Bit 8 (the ninth bit value), the most significant bit of register 210, is loaded with a '0' corresponding to the sign of the dividend mantissa. Because the quotient sign is dealt with in sign XOR 120 described above, the initial mantissa of the dividend is initially taken as a positive number.

Sum register 218 is a 45-bit register and is loaded with the remaining least significant bits of the dividend mantissa. Carry register 214 holds the carries out of carry save adder (CSA) 226 and is cleared upon initial operand loading.

10 bit carry look ahead adder, CLA.A 222, adds the upper bits (bits 51 through 42 in the preferred embodiment) of the selected divisor multiple to the previous upper partial remainder bits from partial remainder register 210, along with 3 bit positions (bits 44 through 42) of sum/carry partial remainder from registers 214 and 218 (to compensate for the two most significant bits of partial remainder that are shifted out during each step).

The upper bits of the partial remainder are also added to the divisor multiple in CLA.B 230. The CLA.B 230 adder is 8 bits wide and finishes in four gate levels. CLA.A 222 and CLA.B 230 overlap in some of their middle bits, but they are implemented with two separate adders because their low order bits are different, and because they have different widths and speed requirements.

To generate the low order sum/carry pairs of the partial remainder, carry save adder CSA 226 adds the selected divisor multiple to the sum and carry bits of the partial remainder stored in registers 214 and 218. To save latch parts as discussed above, CSA 226 works on pairs of bits in the preferred embodiment. That is, it essentially ripple-carries two adjacent bits to form two sum bits and a single carry bit. The quotient bits are also held in a similar manner. During each clock the positive and negative quotient digits are added to produce a two bit sum and a single carry bit, which are stored in quotient registers 240 and 244 respectively. To form the final quotient, the carries are assimilated with a CLA add.

The $q_{i+1}$ quotient digits are used to select via multiplexor 206 the appropriate divisor multiple, either 2d, 1d, 0, −1d or −2d (the term $q_{i+a}d$ in the above SRT algorithm description). In the preferred embodiment, the "selects" are actually implemented as a set of disables, i.e., conditions under which the data should not be passed through. If all inputs are disabled, then 0 is selected by default.

The partial remainder is divided into two parts; the sum and carry, referred to as the a and b variables, respectively. To these are added the divisor multiple multiplexor output bits ($q_{i+1}d$ or "m"). The a, b, and m operands have non-zero elements in the following bit positions. Also shown are the output sum bits that must be generated by CLA.A and CLA.B (x and z, respectively).

| m: | 53 | 52 | 51 | 50 | 49 | 48 | 47 | 46 | 45 | 44 | 43 | 42 | 41 | 40...2 | 1 | 0 |
|---|---|---|---|---|---|---|---|---|---|---|---|---|---|---|---|---|
| a: | 53 | 52 | 51 | 50 | 49 | 48 | 47 | 46 | 45 | 44 | 43 | 42 | 41 | 40...2 | 1 | 0 |
| b: |    |    |    |    |    |    |    |    |    | 44 |    | 42 |    | 40...2 |   | 0 |
| x: |    |    | 51 | 50 | 49 | 48 | 47 | 46 | 45 | 44 | 43 |    |    |    |   |   |
| z: |    | 53 | 51 | 50 | 49 | 48 | —  | —  |    |    |    |    |    |    |   |   |

The divisor multiple m is a full 54 bit value in two's complement form (including a sign), sum variable a is also a full 54 bit value (with sign). Bits 44 through 0 of operand a are held in register 218, and bits 53 through 45 of operand a are held in register 210. The b operand is held in register 214. There is no carry portion of the partial sum from bits 45 through 53 of the carry variable b; this is the region where the partial remainder is kept intact and stored in register 210 to speed up quotient digit selection. In bits 44 through 2 of the b variable, only the even carry values are kept, because the CSA operates on pairs of sum bits in a ripple-carry fashion in the preferred embodiment as described above. Bit b0 of the carry input is set to one when a positive divisor multiple is to be subtracted from the partial remainder for two's complement arithmetic.

The adder CLA.A 222 operates on bits 51 through 42 of a, b, and m. The upper two bits (52 and 53) are not needed, because they are effectively shifted out anyway. Bit 42 is only used to generate a carry into bit 43; the CSA 226 is used to form the sum and carry for bit 42. After the add, the bits are shifted up to form bits 53 through 45 of the new partial remainder. The output bits of CLA.A 222 are labeled as x variables. Adder CLA.A 222 can be implemented with as many as six gate levels.

CLA.B 230 must generate the sign of the partial remainder, bit 53, and sum bits 51 through 48. Bits 46 and 47 are only used insofar as they contribute to the carry in to position 48. Besides these sum bits, two signals are generated. One of the signals is a one when the sign is positive, and bits 52, 51, and 50 are 011 or greater; all these values have the same quotient table entry (2), regardless of the divisor (see Table 1). The other signal is a one when the sign is negative and bits 52, 51, and 50 are 100 or less; all these values have the same quotient table entry (02), regardless of the divisor (See Table 1). Note that bit 52 does not have to be generated; it is subsumed by the 011 or greater and 100 or less signals.

The adder CLA.B 230 operates on bits 53 through 46 of m and a. Bit 45 of a (bit 43 before the shift) is used during the previous clock period to enable the divisor multiplexor-latch bit 46 into the carry in position of CLA.B 230. That is, it is effectively added with the divisor bit 46 to form a carry into position 46 of CLA.B 230. The output bits of CLA.B 230 are labeled as z variables. Although the z variable is comprised of only four bits plus a sign for a total of 5 bits in the preferred embodiment, eight bits of m and a are input to CLA.B for precision purposes. Adder CLA.B 230 has four gate levels.

To merge CLA.A. and CLA.B as discussed above, bits 53 through 42 of operands a, b, and m would be inputs. The sum would be bits 53 and 51 through 43 (a combination of the x and z operands).

CSA 226 adder, as already described, operates on two input bits and a carry in bit to produce two sum bits and a carry out bit. CSA 226 can take four gate levels, so two ripple add stages are sufficient.

For quotient selection, the upper four bits of the divisor d51 through d48, and the four partial remainder bits z51 through z48 and sign z53 generated by CLA.B 230 are input to quotient select logic 234. The two signals generated when the sign bit is either positive, etc., or negative, etc., as described above are also input to quotient select logic 234. Note that there are overlapping ranges for certain quotient digits. For example, when $4d/3 \leq p_i \leq 5d/3$, then either 1 or 2 may be chosen as the quotient digit. When $-d/3 \leq p_i \leq -1d/3$, then either 0 or $-1$ may be chosen as the quotient digit. These overlapping intervals mean that only a few of the upper bits of d and $p_i$ need to be examined to select a proper quotient digit. This also means that a carry save adder (CSA) can be used to hold the partial remainders, with carries being assimilated only for the upper bits required for quotient digit selection, as will be described below.

The inequalities discussed above obtained by combining a radix-4 redundant digit set with SRT division are translated into a table having the upper four bits of the possible partial remainder values in rows, the divisor in columns and the appropriate quotient digit found in the corresponding table location. For those cases where the inequalities reveal that more than one quotient digit would be correct (overlapping ranges), the quotient digit which is entered in the table is that one which requires examination of only the upper few bits of partial remainder. The resulting table, derived from the above inequalities after exploiting the overlaps, is shown in Table 1. Note that in the preferred implementation that two tables are actually implemented, one table for positive partial remainder and one for negative partial remainder.

TABLE 1

| Partial Remainder | | divisor = 1 + x/16 | | | | | | | | | | | | | | |
|---|---|---|---|---|---|---|---|---|---|---|---|---|---|---|---|---|
| negative | positive | 0 | 1 | 2 | 3 | 4 | 5 | 6 | 7 | 8 | 9 | a | b | c | d | e |
| 1111 | 0000 | 0 | 0 | 0 | 0 | 0 | 0 | 0 | 0 | 0 | 0 | 0 | 0 | 0 | 0 | 0 |
| 1110 | 0001 | 0 | 0 | 0 | 0 | 0 | 0 | 0 | 0 | 0 | 0 | 0 | 0 | 0 | 0 | 0 |
| 1101 | 0010 | 1 | 1 | 1 | 1 | 0* | 0 | 0 | 0 | 0 | 0 | 0 | 0 | 0 | 0 | 0 |
| 1100 | 0011 | 1 | 1 | 1 | 1 | 1 | 1 | 1 | 1 | 1 | 1 | 1 | 1 | 1 | 1 | 1 |
| 1011 | 0100 | 1 | 1 | 1 | 1 | 1 | 1 | 1 | 1 | 1 | 1 | 1 | 1 | 1 | 1 | 1 |
| 1010 | 0101 | 1 | 1 | 1 | 1 | 1 | 1 | 1 | 1 | 1 | 1 | 1 | 1 | 1 | 1 | 1 |
| 1001 | 0110 | 2 | A | 1* | 1 | 1 | 1 | 1 | 1 | 1 | 1 | 1 | 1 | 1 | 1 | 1 |
| 1000 | 0111 | 2 | 2 | 2 | 2 | 1* | 1 | 1 | 1 | 1 | 1 | 1 | 1 | 1 | 1 | 1 |
| 0111 | 1000 | 2 | 2 | 2 | 2 | 2 | 2 | 2 | A | 1 | 1 | 1 | 1 | 1 | 1 | 1 |
| 0110 | 1001 | 2 | 2 | 2 | 2 | 2 | 2 | 2 | 2 | 2 | 2 | 1 | 1 | 1 | 1 | 1 |
| 0101 | 1010 | 2 | 2 | 2 | 2 | 2 | 2 | 2 | 2 | 2 | 2 | 2 | 2 | 1 | 1 | 1 |
| 0100 | 1011 | 2 | 2 | 2 | 2 | 2 | 2 | 2 | 2 | 2 | 2 | 2 | 2 | 2 | 2 | 2 |
| 0011 or less | 1100 or greater | 2 | 2 | 2 | 2 | 2 | 2 | 2 | 2 | 2 | 2 | 2 | 2 | 2 | 2 | 2 |

A: 2 if positive, 1 if negative.

A "*" in Table 1 indicates a value that is different than that found in the corresponding table location in the Fandrianto reference. These values are different because differing values in the overlap region were occasionally chosen in the preferred embodiment of the present invention. Also, the values may differ in some cases in order to simplify the bollean equations used to implement the table. Different values may have been chosen to arrive at different logic simplifications.

Table 1 shows the possible binary partial remainder values in rows, the divisor in columns (hexadecimal), and the appropriate quotient in radix 4. For simplicity of illustration, Table 1 shows positive quotient digits which would be appropriate for a negative partial remainder. If the partial remainder is positive, another table for positive partial remainders is implemented in which the appropriate quotient is simply the negative of that shown in Table 1 with the exception of the entries marked with an "A" in the table.

Quotient select logic 234 is in the preferred embodiment a hardware implementation of Table 1. Rather than using a complementer for the partial remainder input to the table, both positive and negative tables are implemented in the preferred embodiment. This approach saves two logic levels. Also in the preferred implementation, the table is implemented with 2 levels of logic gates. That is equations are generated for table outputs as functions for the inputs, and two logic levels are used to implement the equations.

Once the appropriate quotient digits are selected, instead of storing the Q+ and the Q− digits in separate registers as is done in the Fandrianto divider shown in FIG. 1, the Q− digits are subtracted from the Q+ digits using ones complement subtraction at the time they are formed. Note that either Q+ or Q− must be zero at each step. If Q− is zero, 11 (the one's complement of 00) is added to Q+, forming a two bit sum and a one bit carry. For example, if Q+ is 10, the ones complement of Q− is 11, and the sum is 01, with a carry of 1. If Q+ is zero, the ones complement of Q− is the sum and the carry is 0. For example if Q− is −2, then the sum is 01 (ones complement of 10) and carry is 0. The implementation then stores the resulting two sum bits and the single carry bit in separate sum and carry registers, respectively, for a total of three bits for each quotient digit. The sums and carries are added together to form the final quotient when the division is complete. Using the same example as that shown above:

```
quotient digits =  0 +1 −2 +1 −1  0 +2, then
carry =            0  1  0  1  0  0  1
sum =                 11 00 01 00 10 11 01
                                         1 (carry in for twos
                                            complement)
quotient =            00 00 10 00 11 00 10
```

The sum and carry registers are added at the end of the division to form the resultant quotient.

Although specific embodiments have been illustrated and described herein for purposes description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those of skill in the electrical and computer arts will readily appreciate that the present invention may be implemented in a very wide variety of embodiments. This application is intended to cover any adaptations or variations of the preferred embodiment discussed herein. Therefore, it is manifestly intended that this invention be limited only by the claims and the equivalents thereof.

I claim:

1. An apparatus for performing division, comprising;
   first register means for storing a plurality of the least significant bits of a partial remainder and for sourcing a previous sum/carry partial remainder;
   second register means for storing a plurality of the most significant bits of the partial remainder, and for sourcing a previous assimilated partial remainder;
   multiplexor means, coupled to receive a divisor and coupled to receive a predicted next quotient, for selecting a divisor multiple and producing therefrom a selected divisor multiple;
   first adder means coupled to receive the previous sum/carry partial remainder and coupled to receive the selected divisor multiple, said first adder means for adding the previous sum/carry partial remainder and the selected divisor multiple and producing therefrom a next sum/carry partial remainder;
   second adder means coupled to receive a plurality of the bits of the previous sum/carry partial remainder, coupled to receive a plurality of the bits of the previous assimilated partial remainder, and coupled to receive a plurality of the bits of the selected divisor multiple, said second adder means for adding a plurality of the upper bits of the selected divisor multiple to a plurality of the upper bits of the previous assimilated partial remainder and to a plurality upper bits of the previous sum/carry partial remainder and producing therefrom a next assimilated partial remainder;
   third adder means coupled to receive the previous assimilated partial remainder and coupled to receive a plurality of the bits of the selected divisor multiple, said third adder means for adding a plurality of the upper bits of the selected divisor multiple to a plurality of the upper bits of the previous assimilated partial remainder and producing therefrom a plurality of the upper bits of a next partial remainder; and
   a quotient select circuit adapted to produce the predicted next quotient under control of the plurality of the upper bits of the next partial remainder and a plurality of the most significant bits of the divisor, and having an output operatively coupled to an input of said multiplexor means.

2. The apparatus of claim 1 wherein said first adder means includes a carry save adder.

3. The apparatus of claim 1 wherein said second and third adder means each include a carry lookahead adder.

4. The apparatus of claim 1 wherein said quotient select circuit includes a quotient select look-up table.

5. The apparatus of claim 2 wherein said carry save adder ripple carries two adjacent bits of the previous sum/carry partial remainder and of the selected divisor multiple to form two sum bits and a single carry bit of the partial remainder to produce therefrom a partial remainder in sum and carry form.

6. The apparatus of claim 1 further including:
   exponent subtract means for producing a quotient exponent; and
   sign means for producing a quotient sign.

7. The apparatus of claim 1 further including:
   quotient register means for storing the predicted next quotient in sum and carry form.

8. The apparatus of claim 7 further including adder means, connected to receive the predicted next quotient in sum and carry form, for adding quotient sums and quotient carries and producing therefrom a quotient in assimilated form.

9. An apparatus for performing division, comprising:
   first register means for storing a plurality of the least significant bits of a partial remainder and for sourcing a previous sum/carry partial remainder;
   second register means for storing a plurality of the most significant bits of the partial remainder and for sourcing a previous assimilated partial remainder;

multiplexor means, coupled to receive a divisor, for selecting a divisor multiple and producing therefrom a selected divisor multiple;

adder means, including a carry save adder, coupled to receive the previous sum/carry partial remainder, coupled to receive the previous assimilated partial remainder, and coupled to receive the selected divisor multiple, and having a first output operatively coupled to an input of said first register means, a second output operatively coupled to an input of said second register means, said adder means for:

adding a plurality of the most significant bits of the selected divisor multiple to the previous assimilated partial remainder, and to a plurality of the most significant bits of the previous sum/carry partial remainder to produce a next assimilated partial remainder, adding a plurality of the most significant bits of the selected divisor multiple to a plurality of the most significant bits of the previous assimilated partial remainder to produce a plurality of the most significant bits of a next partial remainder, and adding the previous sum/carry partial remainder and the selected divisor multiple to produce the next sum/carry partial remainder; and table means, coupled to receive the plurality of the most significant bits of the next partial remainder and coupled to receive a plurality of the most significant bits of the divisor, and having an output operatively coupled to an input of said multiplexor means, for producing a predicted next quotient.

10. The apparatus of claim 9 wherein the selected divisor multiple is dependent on the predicted next quotient.

11. An apparatus for performing division in a computing machine, comprising:

input means for receiving a divisor and a dividend;

a selector coupled to receive the divisor and connected for selecting a divisor multiple under control of a predicted next quotient;

a sum/carry partial remainder register connected to the input means to receive and store a first portion of a partial remainder in sum and carry form;

an assimilated partial remainder register connected to the input means to receive and store a second portion of the partial remainder in assimilated form;

a carry save adder coupled to an output of said sum/carry partial remainder register, coupled to an output of said selector and having an output coupled to an input of said sum/carry partial remainder register;

a first carry lookahead adder coupled to an output of said assimilated partial remainder register, coupled to an output of said sum/carry partial remainder register, and coupled to an output of said selector, and having an output coupled to an input of said assimilated partial remainder register;

a second carry lookahead adder coupled to an output of said assimilated partial remainder register and coupled to an output of said selector; and a predicted next quotient look-up table coupled to an output of said second carry look-ahead adder and coupled to said input means to receive a plurality of the most significant bits of the divisor, and having an output coupled to an input of said selector.

* * * * *

UNITED STATES PATENT AND TRADEMARK OFFICE
CERTIFICATE OF CORRECTION

PATENT NO. : 5,258,944

DATED : November 2, 1993

INVENTOR(S) : James E. Smith

It is certified that error appears in the above-identified patent and that said Letters Patent is hereby corrected as shown below:

in the Abstract, line 8, please delete "look ahead" and insert --lookahead--.

At Column 2, line 16, please delete "Pi + b" and insert --Pi + 1--.

At Column 2, line 22, please delete both "$\leqq$" and insert --$\leq$--.

At Column 2, line 25, please delete both "$\leqq$" and insert --$\leq$--.

At Column 2, line 29, please delete "-3d/3" and insert --8d/3--.

At Column 2, line 30, please delete both "$\leqq$" and insert --$\leq$--.

At Column 2, line 41, please delete "{-3," and insert --{-2,--.

At Column 2, line 48, please delete "1)." and insert --$\underline{1}$).--.

At Column 2, line 51, please delete "1001" and insert --100$\underline{1}$--.

At Column 2, line 52, please delete "0110" and insert --01$\underline{1}$0--.

At Column 2, line 52, please delete "1110" and insert --1$\underline{11}$0--.

UNITED STATES PATENT AND TRADEMARK OFFICE
CERTIFICATE OF CORRECTION

PATENT NO. : 5,258,944

DATED : November 2, 1993

INVENTOR(S) : James E. Smith

It is certified that error appears in the above-identified patent and that said Letters Patent is hereby corrected as shown below:

At Column 2, line 57, please delete "1001" and insert --100$\underline{1}$--.

At Column 2, line 58, please delete "0110" and insert --01$\underline{1}$0--.

At Column 2, line 59, please delete "1110" and insert --1$\underline{11}$0--.

At Column 2, line 65, please delete "012" and insert --01$\underline{2}$--.

At Column 2, line 66, please delete "021" and insert --02$\underline{1}$--.

At Column 2, line 67, please delete "121" and insert --12$\underline{1}$--.

At Column 3, line 7, please delete both "$\leq$" and insert --$\leq$--.

At Column 3, line 8, please delete both "$\leq$" and insert --$\leq$--.

At Column 3, line 9, please delete both "$\leq$" and insert --$\leq$--.

At Column 3, line 10, please delete both "$\leq$" and insert --$\leq$--.

At Column 3, line 11, please delete both "$\leq$" and insert --$\leq$--.

At Column 3, line 12, please delete both "$\leq$" and insert --$\leq$--.

UNITED STATES PATENT AND TRADEMARK OFFICE
CERTIFICATE OF CORRECTION

PATENT NO. : 5,258,944    Page 3 of 4
DATED : November 2, 1993
INVENTOR(S) : James E. Smith It is certified that error appears in the above-indentified patent and that said Letters Patent is hereby corrected as shown below:

At Column 3, line 54, please delete "(+Q 34)" and insert --+ Q 34--.

At Column 3, line 55, please delete "( - Q 38)" and insert ---Q 38--.

At Column 3, line 64, please insert --register 34-- following " + Q ".

At Column 5, line 53, please delete both "$\leqq$" and insert --$\leq$--.

In Column 7, line 35, please delete "look ahead" and insert --lookahead--.

In Column 7, line 37, please delete "look ahead" and insert --lookahead--.

UNITED STATES PATENT AND TRADEMARK OFFICE
CERTIFICATE OF CORRECTION

PATENT NO. : 5,258,944
DATED : November 2, 1993
INVENTOR(S) : James E. Smith

It is certified that error appears in the above-indentified patent and that said Letters Patent is hereby corrected as shown below:

At Column 8, line 37, please delete "qi + $_a$d " and insert --$q_i$ + $_1$d--.

At Column 10, line 7, please delete both "$\lessapprox$" and insert --$\leq$--.

At Column 10, line 8, please delete both "$\lessapprox$" and insert --$\leq$--.

At Column 10, line 63, please delete "radix 4" and insert --radix-4--.

At Column 12, line 19, please insert --of the-- after "plurality".

In the Claims, at Column 14, line 31, please delete "look-ahead" and insert --lookahead--.

Signed and Sealed this

Fourteenth Day of October, 1997

Attest:

BRUCE LEHMAN

*Attesting Officer*   *Commissioner of Patents and Trademarks*